(No Model.) 2 Sheets—Sheet 1.
J. R. DEW.
FRUIT DRIER.
No. 284,726. Patented Sept. 11, 1883.
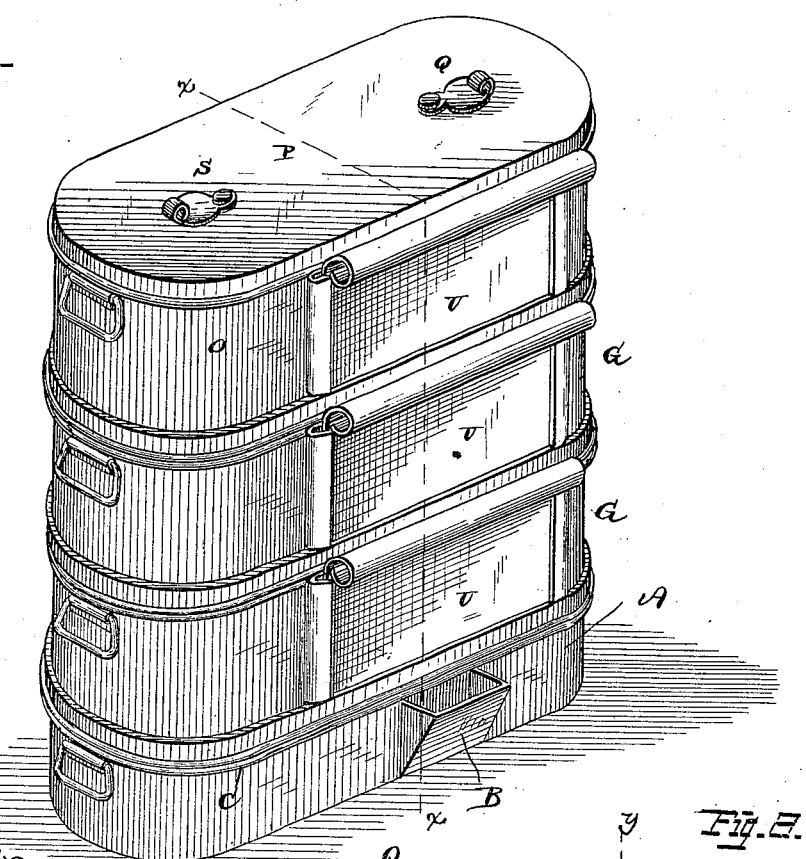
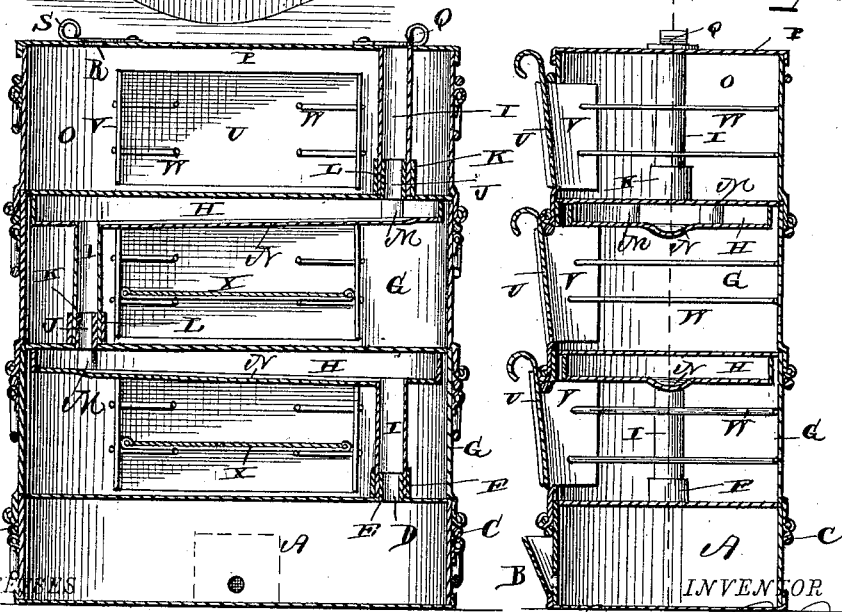
WITNESSES
F. L. Durand
J. Reed Littell
INVENTOR
Joseph R. Dew
by A. Snow & Co.
Attorneys.

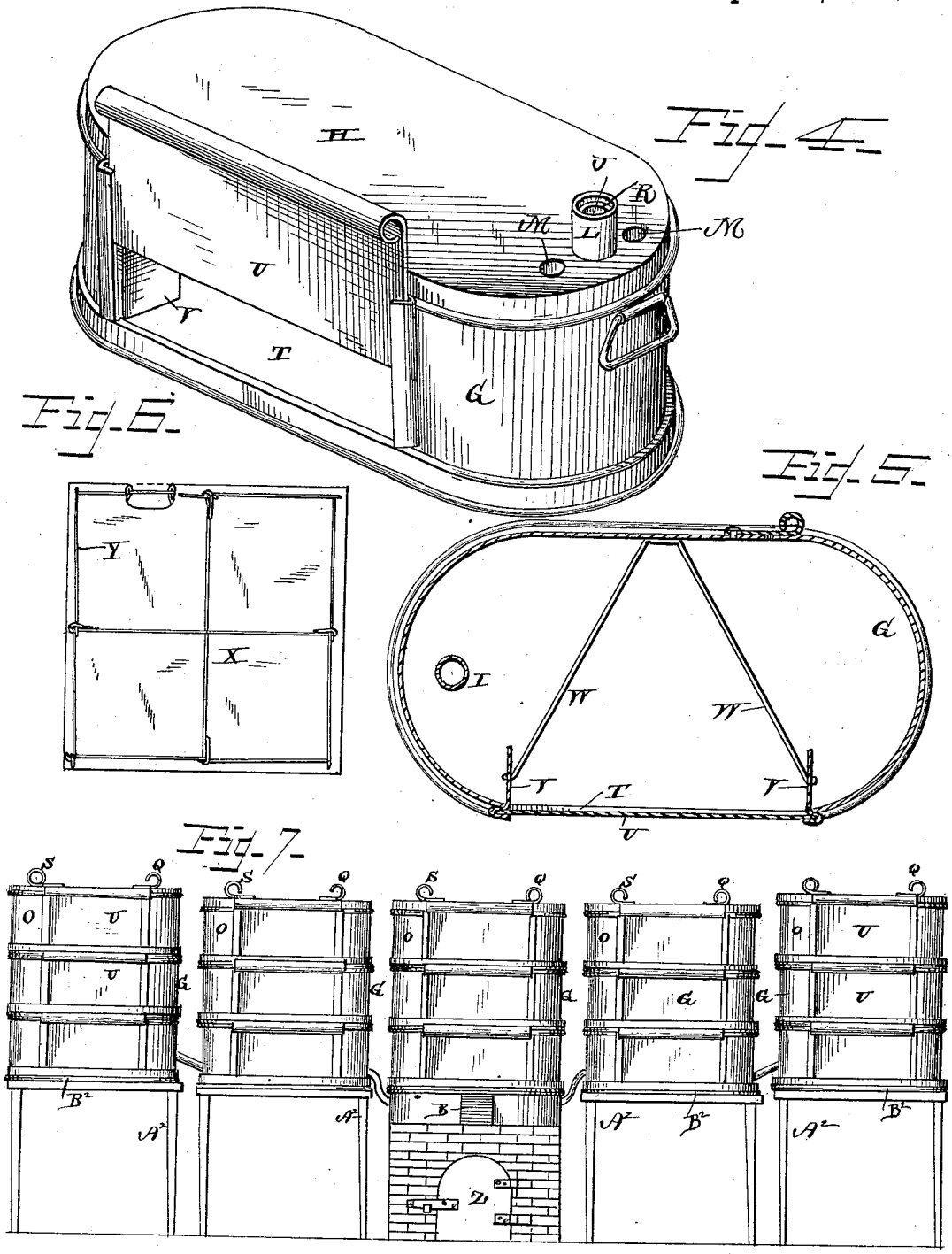

UNITED STATES PATENT OFFICE.

JOSEPH R. DEW, OF KNOXVILLE, TENNESSEE.

FRUIT-DRIER.

SPECIFICATION forming part of Letters Patent No. 284,726, dated September 11, 1883.

Application filed April 28, 1883. (No model.)

*To all whom it may concern:*

Be it known that I, JOSEPH R. DEW, a citizen of the United States, residing at Knoxville, in the county of Knox and State of Tennessee, have invented a new and useful Fruit-Drier, of which the following is a specification, reference being had to the accompanying drawings.

This invention relates to fruit driers or evaporators; and it consists in certain improvements in the construction of the same, which will be hereinafter fully described, and particularly pointed out in the claims.

In the drawings hereto annexed, Figure 1 is a perspective view of my improved fruit-drier. Fig. 2 is a vertical sectional view on the line $x\ x$ in Fig. 1. Fig. 3 is a vertical transverse sectional view on the line $y\ y$ in Fig. 2. Fig. 4 is a detail view, in perspective, of one of the compartments detached. Fig. 5 is a horizontal sectional view of the same. Fig. 6 is a view of one of the drying-trays detached, and Fig. 7 is a view showing a series of my improved fruit-driers connected with and operated by a single boiler.

The same letters refer to the same parts in all the figures.

A in the drawings designates the boiler or steam-generator, which consists of a suitable closed pan of any desired size and shape, preferably, perhaps, of such dimensions as to be conveniently set for operation upon an ordinary kitchen-stove. A separate suitably-constructed heater may, however, be provided, especially when a series of driers are to be operated together, as in Fig. 7 of the drawings. The vessel A is provided in front with a filling tube or funnel, D, which communicates with the bottom of the pan, and near its upper edge it is provided with a circumferential or annular crease or flange, C. The top of the pan A is provided near one end with an opening, D, surrounded by a double flange, E F.

G G are the drying-compartments of the device, each of which consists of a shell shaped substantially like the base-pan or generator, over which the shell of the lowermost compartment G fits in such a manner as to rest upon the flange or crease C. The compartments G are bottomless; but each has a double top, forming a closed pan or vessel, H. From one end of the said closed top pan a tube, I, extends downwardly nearly to the level of the lower edge of the shell. The other end of the said top pan of each compartment has an opening, J, in its upper side, surrounded by a double flange, K L. Adjoining the opening J are vertical ventilating tubes or flues M M, extending entirely through the top pan, H, as clearly shown in the drawings.

It will be observed that the tubes I, which are the steam-tubes, are at opposite ends of the alternate compartments G. It will also be observed that the bottoms of the top pans, H, of the several compartments are provided with gutter-shaped depressions N, carrying the water of condensation to the steam-pipes, and thus back to the boiler or generator.

A top compartment, O, is provided, which is different from the compartments G in this, that it has but a single top plate, P, through which the steam-pipe I extends. The upper end of the said steam-tube may be closed by a suitable door or valve, Q. The other end of the top plate, P, is provided with a ventilating-opening, R, for which a valve, S, is also provided.

The several compartments G and O are provided with openings T in front, closed by suitable slide-doors, U. At the sides of the openings T are inturned flanges V, to which are secured the front ends of the supporting-rods W, the rear ends of which are secured to the backs of the respective casings. The rods W serve to support the drying-trays, which are guided and held from lateral displacement by the flanges V.

The drying-trays, which are denoted by letter X, may be constructed, as shown in Fig. 6 of the drawings, of suitable wire frames, Y, covered with cloth or canvas of ordinary coarse texture. By this method of construction, the drying-trays, of which it is desirable to have a considerable number, may be manufactured at a trifling cost. It will of course be understood, however, that woven-wire trays, or trays of any suitable construction, may be used in connection with my invention, when so desired, without departing from the spirit of my invention.

In operation the parts are connected as clearly shown in Fig. 3 of the drawings, the steam-pipe I of each compartment being connected with the steam-opening of the one next below. The steam from the generator will thus take a zigzag course through the several pans, heating the interior of the shells or compartments, and drying the fruit which has been placed upon the trays therein. The moisture-laden hot air passes through the ventilating-openings, and finally out through the top opening, where its escape may be regulated by the valve. The escape of the steam may likewise be regulated, and the water of condensation returns in the manner described to the boiler or generator. The joints between the steam-pipes and openings are made steam-tight by the water of condensation which will accumulate between the flanges surrounding the openings, thus forming water-seals for the said joints.

The drying-trays are easily accessible, and the construction of the whole device is simple and convenient.

It will be observed that any desired number of the drying-compartments $g$ may be used, and that the said compartments, when not in use, may be easily separated and packed away. I would also invite attention to the fact that the device, when not in use as a fruit-drier, will render good service as a kitchen-safe by substituting perforated or netted doors for the slides herein shown and described.

My invention as above described may be operated successfully on an ordinary kitchen stove or range. In Fig. 7 of the drawings I have illustrated how a series of the driers may be operated together. I place the central drier upon a suitable furnace, Z, and the remainder of the driers to be operated upon suitable stands, $A^2$, adjoining the said furnace. The driers, except the central one, are destitute of the boiler or generator; but the steam-pipes of their lowermost drying-chambers are connected with the generator of the central drier. The said lowermost drying-chambers are also provided with bottoms $B^2$ to confine the heat. The operation is obvious.

I claim as my invention and desire to secure by Letters Patent of the United States—

1. In a fruit-drier, the herein-described drying-compartments, adapted to be placed on top of each other and of a boiler or steam-generator, said compartments consisting of shells having steam-pans at the top, provided at one end with downwardly-projecting steam-pipes, and at the other end with openings surrounded by upwardly-projecting double flanges, as set forth.

2. In a fruit-drier, the herein-described drying-compartments, adapted to be placed on top of each other, and having steam-pans at the top, provided at one end with downwardly-projecting steam-pipes, and at the other end with openings surrounded by upwardly-extending flanges, and ventilating-flues extending through the said pans, as set forth.

3. In a fruit-drier, the herein-described drying-compartments, consisting of shells having steam-pans at the top, and provided with openings in front having suitable slide-doors, and provided at the edges with inturned flanges, and tray-supporting rods secured at the back to the casing or shell and at the front to the said flanges, as set forth.

4. The herein-described fruit-drier, consisting, essentially, of a boiler or generator having a filling-tube, and provided with an opening in its upper side, at one end, surrounded by a double flange, a series of drying-compartments consisting of shells having steam-pans at the top, and suitable tray-supporting rods, the top compartment constructed without a steam-pan, and means, substantially as described, for conducting the steam and moisture laden air, in a zigzag course through the steam-pans and compartments, and valves for controlling the escape of the same at the top, as set forth.

In testimony that I claim the foregoing as my own I have hereto affixed my signature in presence of two witnesses.

JOSEPH R. DEW.

Witnesses:
W. K. MITCHELL,
JOS. R. MITCHELL.